US008686887B2

(12) United States Patent
Savoj

(10) Patent No.: US 8,686,887 B2
(45) Date of Patent: Apr. 1, 2014

(54) NFC TRANSCEIVER WITH CURRENT CONVERTER

(75) Inventor: Jafar Savoj, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 13/282,336

(22) Filed: Oct. 26, 2011

(65) Prior Publication Data

US 2013/0106634 A1   May 2, 2013

(51) Int. Cl.
*H03M 1/66* (2006.01)

(52) U.S. Cl.
USPC ........ 341/144; 455/41.1; 455/41.2; 455/11.1; 455/556.2; 455/456.1; 340/10.1; 705/16; 705/21; 705/24; 705/67; 705/71; 726/3; 726/26; 343/702; 370/278; 370/282; 370/310; 370/311; 375/140; 375/362; 375/150; 375/257

(58) Field of Classification Search
USPC ........ 341/144; 455/41.1, 41.2, 334, 419, 558; 340/10.1; 705/16, 21, 24, 44, 67, 71, 705/76, 14.27, 26.41; 726/3, 26; 343/702; 370/278, 282, 310, 311; 375/140, 150, 375/257, 362; 709/206, 227
See application file for complete search history.

(56) References Cited

U.S. PATENT DOCUMENTS

| 7,590,384 | B2 * | 9/2009 | Dawidowsky | 455/41.1 |
|---|---|---|---|---|
| 7,679,514 | B2 | 3/2010 | Rofougaran et al. | |
| 7,734,307 | B2 * | 6/2010 | Dawidowsky | 455/522 |
| 7,786,870 | B2 | 8/2010 | Zettler | |
| 7,831,227 | B2 | 11/2010 | Rofougaran et al. | |
| 8,140,010 | B2 * | 3/2012 | Symons et al. | 455/41.1 |
| 8,150,321 | B2 * | 4/2012 | Winter et al. | 455/41.2 |
| 8,264,991 | B2 * | 9/2012 | Arunan | 370/310 |
| 8,326,224 | B2 * | 12/2012 | Butler | 455/41.1 |
| 8,355,670 | B2 * | 1/2013 | White | 455/41.1 |
| 2010/0112941 | A1 | 5/2010 | Bangs et al. | |
| 2013/0109304 | A1 * | 5/2013 | Marcu et al. | 455/41.1 |

FOREIGN PATENT DOCUMENTS

WO    2008013418 A1    1/2008

OTHER PUBLICATIONS

Morris, et al., A 90nm CMOS 13.56MHz NFC Transceiver, IEEE Asian Solid-State Circuits Conference Nov. 16-18, 2009 / Taipei, Taiwan, pp. 25-28.
International Search Report and Written Opinion—PCT/US2012/062292—ISA/EPO—Feb. 14, 2013.
"Near Field Communication PN531—μC Based Transmission Module", Philips Semiconductors. Short Form Specification, vol. Revision 2.0, Feb. 1, 2004, pp. 1-19, XP007900763.
Sarkar, S., et al., "An 8-bit 1.8 V 500 MSPS CMOS Segmented Current Steering DAC", VLSI, 2009. ISVLSI '09. IEEE Computer Society Annual Symposium on, IEEE, Piscataway, NJ, USA, May 13, 2009, pp. 268-273, XP031476283, ISBN: 978-1-4244-4408-3.
Chen, et al., "Low-Voltage Low-Power LVDS Drivers," IEEE Journal of Solid-State Circuits, vol. 40, No. 2, Feb. 2005, pp. 472-479.

(Continued)

*Primary Examiner* — Lam T Mai
(74) *Attorney, Agent, or Firm* — William M. Hooks

(57) ABSTRACT

Exemplary embodiments are directed to near field communication A device may include a current digital-to-analog converter (DAC) configured to convey a current to an antenna in a first near-field communication (NFC) mode and enable for load modulation in a second NFC mode.

25 Claims, 6 Drawing Sheets

(56) References Cited

OTHER PUBLICATIONS

Kwon, et al., A Single-Chip CMOS Transceiver for UHF Mobile RFID Reader, 2007 IEEE International Solid-State Circuits Conference, pp. 216-218.

Meillere, et al., "13.56 MHz CMOS transceiver for RFID applications," Analog Integr Circ Sig Process (2006) 49:249-256.

Min, "An Analog Front-End Circuit for ISO/IEC14443-Compatible RFID Interrogators," ETRI Journal, vol. 26, No. 6, Dec. 2004 pp. 560-564.

Morris, et al., A 90nm CMOS 13.56MHz NFC Transceiver, IEEE Asian Solid-State Circuits Conference Nov. 16-18, 2009/Taipei, Taiwan, pp. 25-28.

* cited by examiner

NFC TRANSCEIVER WITH CURRENT CONVERTER

BACKGROUND

1. Field

The present invention relates generally to near field communication (NFC). More specifically, the present invention relates to NFC transceivers, which include a programmable digital-to-analog converter (DAC) for driving an antenna in an active mode and performing load modulation in a passive or powered-by-field mode.

2. Background

Near Field Communication (NFC) is wireless technology that can enable for short range exchange of information between two or more devices. Devices capable of NFC can simplify presence-oriented transactions to enable rapid and more secure exchange of information, for example, as in purchases for goods and services, or the exchange of information therein.

As a person skilled in the art will appreciate and understand, NFC technologies communicate over magnetic field induction, where at least two loop antennas are located within each other's "near field," effectively forming an air-core transformer that operates within a globally available and unlicensed radio frequency which, as indicated, is an industrial, scientific and medical (ISM) band of 13.56 MHz, with a band width of almost two (2) MHz.

Conventional NFC transceivers may include analog components, which may result in large area requirements and may complicate support of desired NFC standards. Moreover, conventional NFC transceivers may require additional circuitry for supporting load modulation.

A need exists for methods, systems, and devices for an enhanced NFC transceiver. More specifically, a need exists for an NFC transceiver, which requires less area than conventional transceivers and supports both active and passive mode operation. A need also exists for systems including the NFC transceiver, and associated methods of operation.

DETAILED DESCRIPTION

Figure 1:
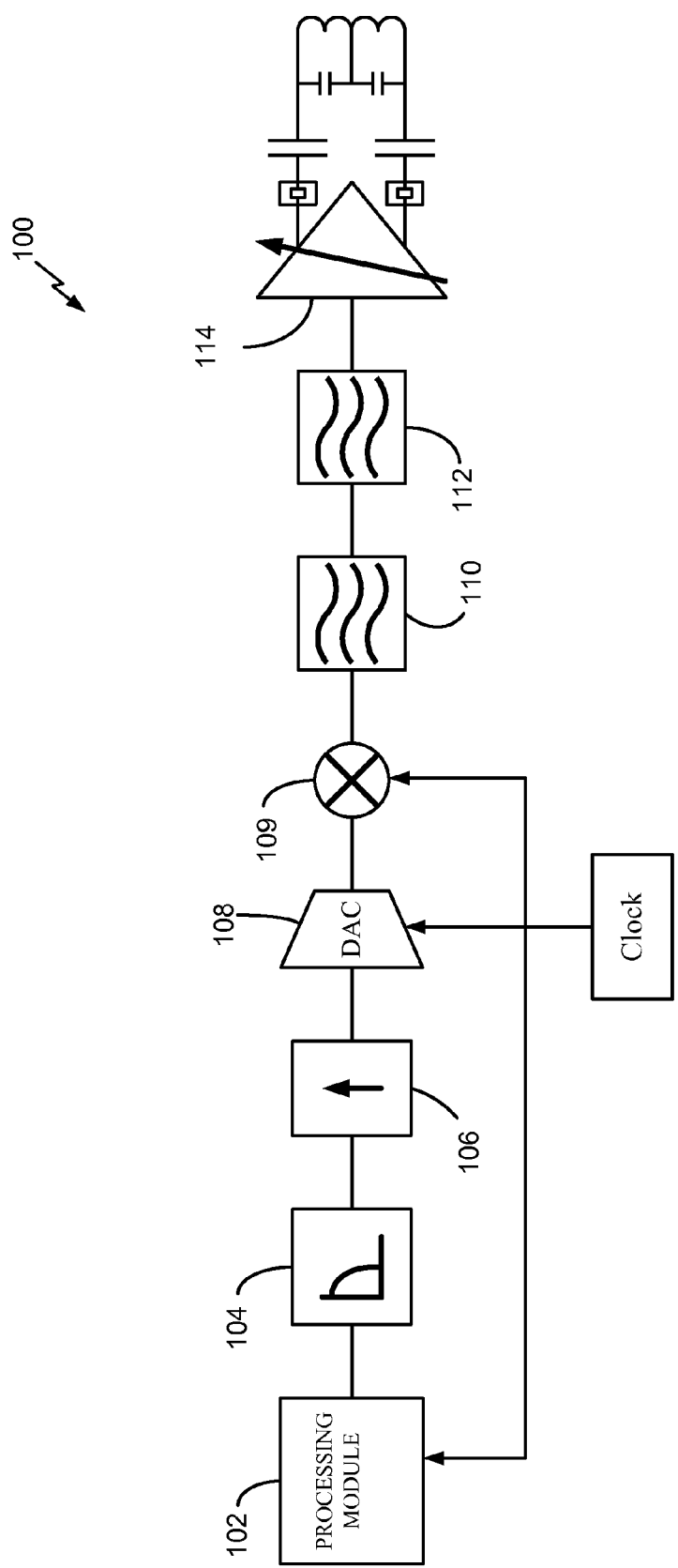
FIG. 1 is block diagram of a conventional NFC transmitter.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

NFC is a communication standard that enables wireless communication devices, such as cellular telephones, Smart-Phones, and personal digital assistants (PDAs) to establish peer-to-peer (P2P) networks. NFC may enable electronic devices to exchange data and initiate applications automatically when they are brought in close proximity, for example ranges from less than a centimeter to a distance of about 10 cm. As non-limiting examples, NFC may enable downloading of images stored in a digital camera to a personal computer, downloading of audio and video entertainment to portable devices, or downloading of data stored in a SmartPhone to a personal computer or other wireless device. NFC may be compatible with smart card technologies and may also be utilized to enable purchase of goods and services. In an exemplary embodiment, the frequency used for NFC is centered at about 13.56 MHz.

An NFC transceiver may include circuitry to impedance match to an antenna or other circuitry within a coupling element. The NFC transceiver may also include suitable logic, circuitry, processors, code, or combinations thereof to enable the reception and transmission of NFC signals, for which the carrier frequency of the received signal is in the NFC frequency band. Data may be modulated on the carrier frequency.

Conventional NFC may be based on Radio-Frequency Identification (RFID) technology that uses field induction to enable communication between electronic devices in close proximity. This can enable users to perform intuitive, safe, contactless transactions. Conventional state-of-the art NFC may operate at 13.56 MHz and transfer data at up to 424 Kbits/second. Of course, improvements to NFC technology may result in differing frequency(s), differing throughput values, or both. Communication between two or more NFC-compatible devices may occur when the devices are brought within a short distance from one another and may be compatible with other known wireless technologies such as Bluetooth or Wi-Fi, for example.

Currently, there are two principal modes of operation available under present NFC standards: active and passive (i.e., powered by field). In active mode, a device may generate its own radio field to transmit data. In passive mode, one device may generate a radio field, while the other uses load modulation to transfer data. The passive mode of communication is often useful for limited power devices, such as mobile phones and PDAs, which need to minimize energy use. It may also prevent disruption of NFC communication when the device battery runs out.

In the various exemplary embodiments described herein, the term NFC is understood to encompass any now or future known wireless or near-proximity communication protocols or systems that facilitate the short-range wireless transfer of information, and is understood to not be limited to current standards or protocols promulgated by an NFC standards body or organization. Accordingly, NFC is understood to be applied herein as a generic sense of the term.

As will be understood by a person having ordinary skill in the art, it may be advantageous for a NFC transceiver to provide an adequate swing in an active mode, which may also be referred to herein as an "initiator mode" and perform load modulation in a passive mode, which may also be referred to herein as a "tag mode" or a "power-by field mode." As will be understood by a person having ordinary skill in the art, implementation of such an NFC transceiver in true analog form may result in large area requirements and may complicate support of multiple standards, which may be required in NFC applications. Furthermore, conventional NFC transceivers may only be configured to perform a single function (i.e., operate in a single mode, either passive or active).

Exemplary embodiments of the present invention, as described herein, are related to a NFC transceiver, which includes a programmable digital-to-analog converter (DAC) to support both load modulation in a passive mode (i.e., tag mode) and current driving in an active mode (i.e., initiate mode). The NFC transceiver may enable for other associated components (e.g., UPC filters) to be implemented with digital components, which may result in ease of design and reduced an amount of required area.

According to one exemplary embodiment of the present invention, a NFC transceiver may include a current digital-to-analog converter (DAC), which is coupled to an antenna. The current DAC may also be coupled to and configured to receive a signal from a digital component, such as a digital filter (e.g., an UPC filter). Moreover, the current DAC may include a plurality of drivers, wherein each driver of the plurality of drivers is configured to convey a current to the antenna. As described more fully below, the current DAC may be configured to drive a current in a first near-field communication (NFC) mode (i.e., an active mode) and support load modulation in a second NFC mode (e.g., a passive mode).

FIG. 1 is a block diagram of an NFC transmitter 100 that utilizes an RF path. Transmitter 100 includes a processing module 102, a pulse shaper 104, an interpolator 106, each of which are digital components. Transmitter 100 further includes a digital-to-analog converter (DAC) 108, which is an analog component, and an up-converter (UPC) mixer 109, which is an RF component. Moreover, transmitter 100 includes reconstruction filters 110 and 112, and power amplifier 114, which are also RF components. As will be appreciated by a person having ordinary skill in the art, NFC transmitter 100 may utilize a large area due to the strict bandwidth requirements on analog filters and may suffer from large variations due to mismatches in analog components. Further, it is noted that NFC transmitter 100 may additionally require an electromagnetic compatibility (EMC) filter to suppress output harmonics of power amplifier 114. Moreover, NFC transmitter 100 requires additional circuitry to support load modulation in a passive mode (i.e., tag mode).

Figure 2:
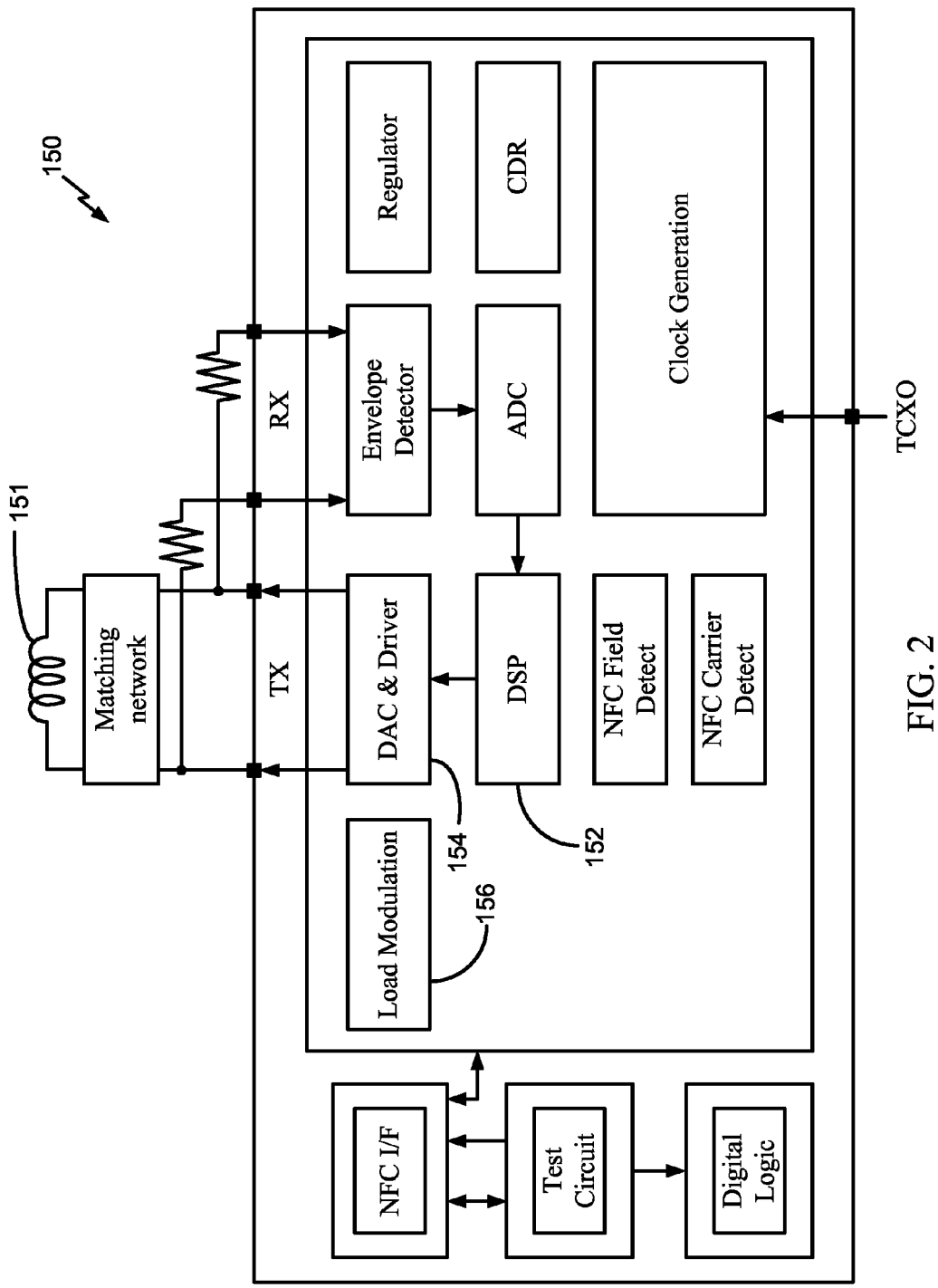
FIG. 2 is a block diagram of an NFC system including a transmitter, according to an exemplary embodiment of the present invention.

FIG. 2 is a block diagram of an NFC system 150, which is configured to support both active and passive modes, as mentioned above. NFC system 150 includes, among other components, an antenna 151, a digital signal processor (DSP) 152, which is also commonly referred to as a baseband modem, a digital-to-analog converter (DAC) & driver module 154, and load modulation module 156. As will be appreciated by a person having ordinary skill in the art, DAC & driver module 154 may be utilized in an active mode and load modulation module 156 may be utilized in a passive mode. However, it is noted that digital-to-analog converter (DAC) & driver module 154 are separate and distinct components within NFC system 150.

Figure 3:
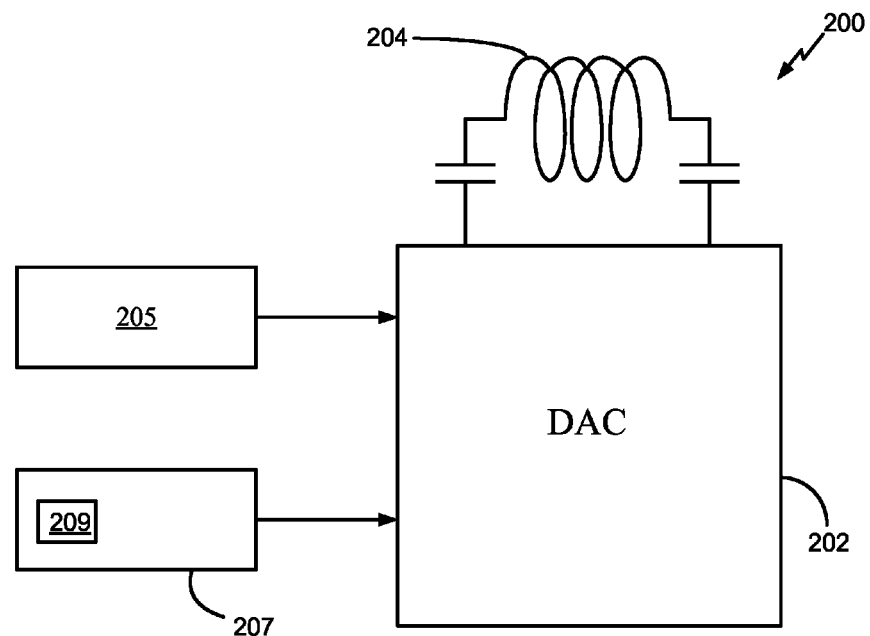
FIG. 3 illustrates a system including a device comprising a current digital-to-analog converter (DAC) coupled to an antenna, in accordance with an exemplary embodiment of the present invention.

FIG. 3 illustrates a system 200 including a current digital-to-analog converter (DAC) 202, according to an exemplary embodiment of the present invention. It is noted that current DAC 202 may also be referred to herein as a "segmented DAC." Current DAC 202 is coupled to an antenna 204 and may be configured to receive one or more digital signals from a digital component, such as, for example only, a filter, such as a digital up-conversion (UPC) filter. Current DAC 202 may also be configured to receiver one or more control signals from a control module 207, which may comprise, for example only, a processor, a controller, or the like. Control module 207 may comprise a mode selector 209 configured to determine whether system 200 should be in an active mode or a passive mode. Control module 207 may determine a mode (i.e., active or passive) of system 200 via one or more sensors, user input, or other suitable, known means. Upon determination of a mode, control module 207 may convey one or more control signals to current DAC 202 for controlling a configuration thereof.

Further, as described more fully below, current DAC 202 may be configured to drive a current into antenna 204. More specifically, in one operational mode (e.g., an active mode) current DAC 202 may be configured to convey a current directly to antenna 204 and, therefore, in comparison to conventional NFC transmitters, a separate driver may not be required.

It is noted that an antenna driver, which is implemented by current DAC 202, may produce a variety of signal modulations. Further, at finer process nodes (e.g., CMOS process nodes), UPC filters may be implemented by digital components without significant penalty, resulting in ease of design and area reduction. More specifically, for example, an up-converter (UPC) and filters within system 200 may be implemented with digital components. It is noted that current DAC 202 may be operated at a multiple of 13.56 MHz for enhanced pulse shaping and, therefore, an electromagnetic compatibility (EMC) filter may not be required.

Figure 4:
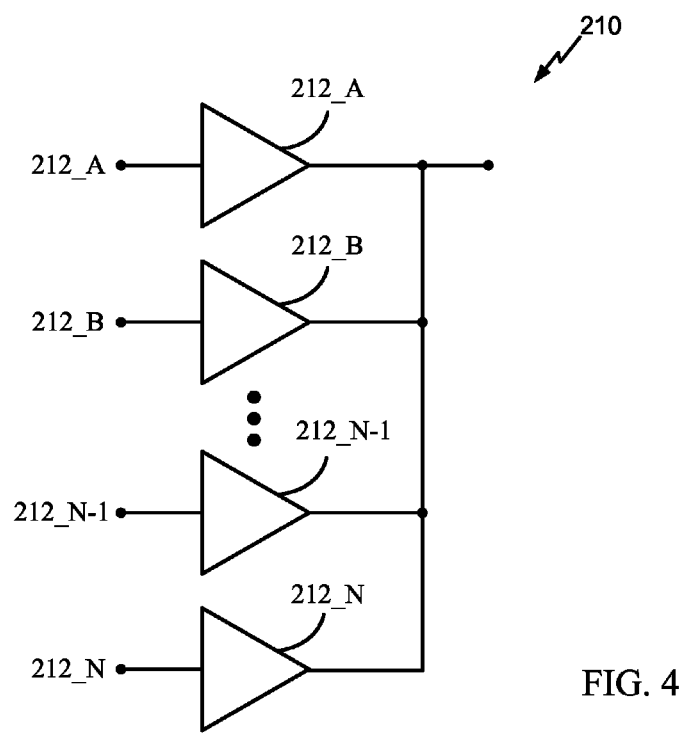
FIG. 4 illustrates an array of drivers within a digital-to-analog converter (DAC), according to an exemplary embodiment of the present invention.

FIG. 4 illustrates an array of drivers 210, which is an example of an array of drivers within current DAC 202. Each driver 216 (i.e., 216_A-216_N) includes an associated input 212 (i.e., 212_A-212_N) and, furthermore, array of drivers 210 includes an output 214. As will be understood by a person having ordinary skill in the art, a current DAC, such as current DAC 202, may include an array of drivers wherein each driver 216 includes one or more cells. For example, driver 216_A may include 2^0 cells (i.e., one cell), driver 216_B may include 2^1 cells (i.e., two cells), driver 216_N−1 may include 2^(N−1) cells (e.g., sixteen cells if N is equal to five), and driver 216_N may include 2^N cells (e.g., thirty-two cells if N is equal to five). It is noted that any number of drivers within an array of drivers is within the scope of the invention.

Figures 5, 6, 7:
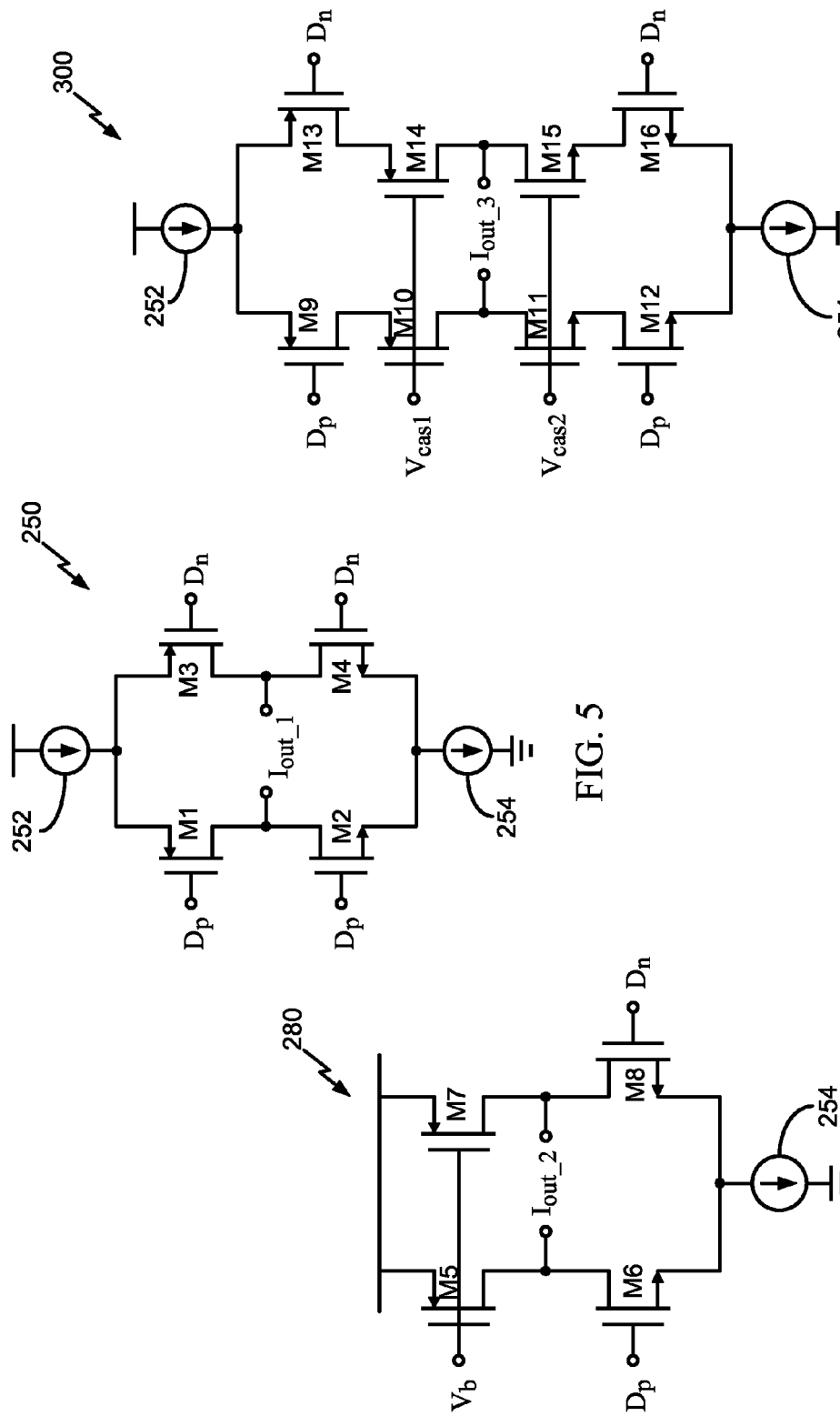
FIG. 5 illustrates a DAC cell including a low-voltage differential signaling (LVDS) driver, according to an exemplary embodiment of the present invention.
FIG. 6 illustrates another DAC cell including an LVDS driver, in accordance with an exemplary embodiment of the present invention.
FIG. 7 illustrates another DAC cell including an LVDS driver, according to an exemplary embodiment of the present invention.

FIG. 5 illustrates a DAC cell 250, according to an exemplary embodiment of the present invention. DAC cell 250 comprises a low-voltage differential signaling (LVDS) driver including a plurality of transistors M1, M2, M3, and M4 and current sources 252 and 254. As will be appreciated by a person having ordinary skill in the art, DAC cell 250 may be configured to receive input signals $D_p$ and $D_n$ from, for example, control module 207, and output a current $I_{out\_1}$. In a contemplated operation, the bias current is switched into the antenna according to the data input. It uses four MOS switches (M1–M4) in a bridged configuration. If switches M1 and M4 are on (Dp=0 & Dn=1), the polarity of the output current is positive. On the contrary, if switches M2 and M3 are on (Dp=1 & Dn=0), the polarity of the output current is negative. It is noted that the present invention is not limited to DAC cell 250 and other cells designs may be within the scope of the invention. For example, with reference to FIG. 6, a DAC cell 280 is illustrated. DAC cell 280 comprises a LVDS driver includes a plurality of transistors M5, M6, M7, and M8 and current source 254. As will be appreciated by a person having ordinary skill in the art, DAC cell 280 may be configured to receive input signals $V_p$, $D_p$ and $D_n$ from, for example, control module 207, and output a current $I_{out\_2}$. This configuration of DAC cell 280 allows the circuit to run from a lower supply, compared to a typical LVDS approach.

Another DAC cell 300, according to an exemplary embodiment of the present invention, is illustrated in FIG. 7. DAC cell 300 comprises a LVDS driver including a plurality of transistors M9, M12, M13, and M16 and current sources 252 and 254. Further, DAC cell 300 includes cascode devices M10, M11, M14 and M15. As will be appreciated by a person having ordinary skill in the art, a cascode device may improve stress related issues of DAC cell 300, especially at higher voltages (e.g., 1.8 volts). More specifically, cascode devices may provide added protection for devices by reducing the voltage drop across those devices. As will be appreciated by a person having ordinary skill in the art, DAC cell 300 may be configured to receive input signals $V_{cas1}$, $V_{cas2}$, $D_p$ and $D_n$ from, for example, control module 207, and output a current $I_{out\_3}$.

As will be appreciated by a person having ordinary skill in the art, a typical technique of NFC is the use of load modulation, in which a device varies a load impedance of its coil to change its resonant frequency and its quality factor Q. This action causes a voltage variation at another device (i.e., a device in an initiator mode).

Figure 8:
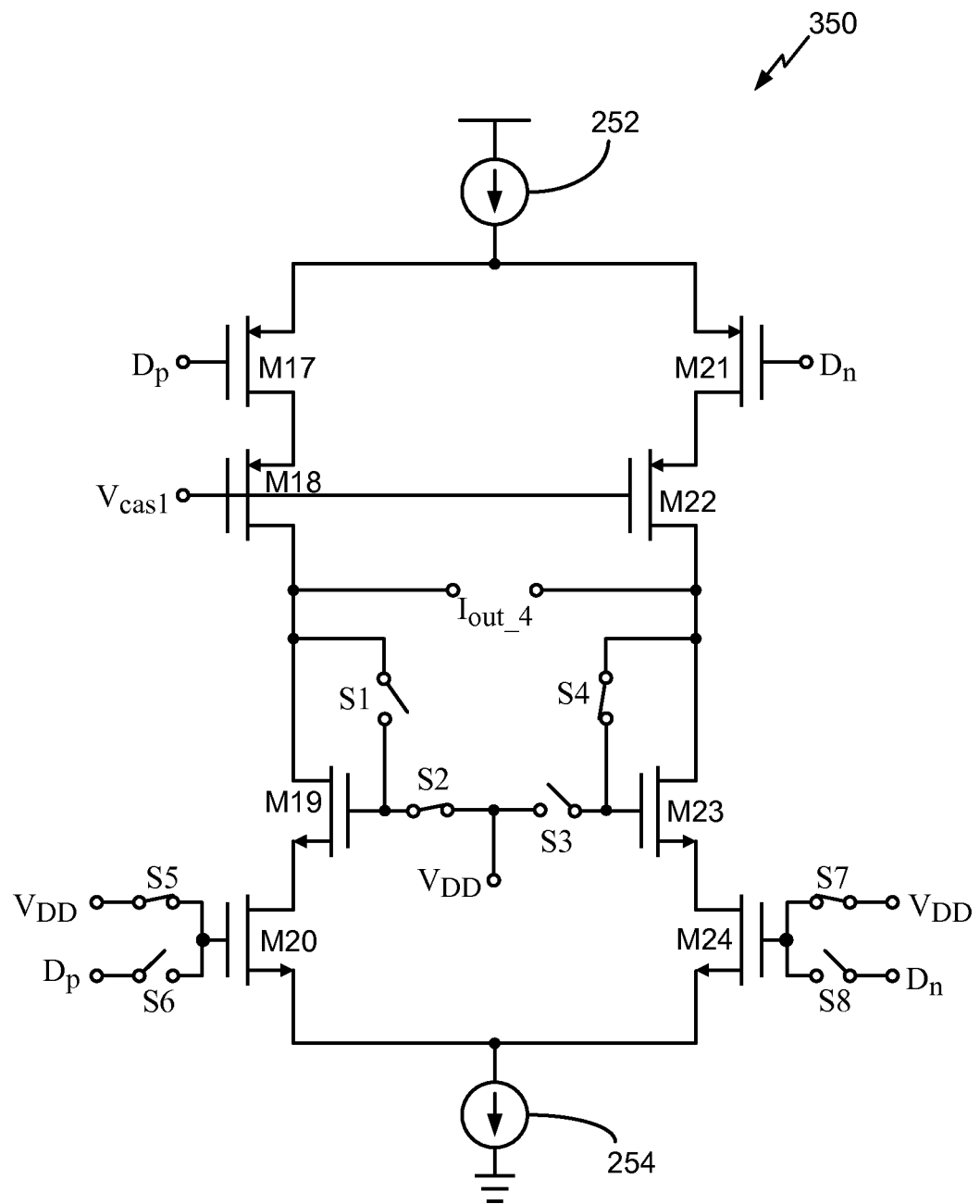
FIG. 8 depicts yet another DAC cell including an LVDS driver, according to an exemplary embodiment of the present invention.
Figure 9:
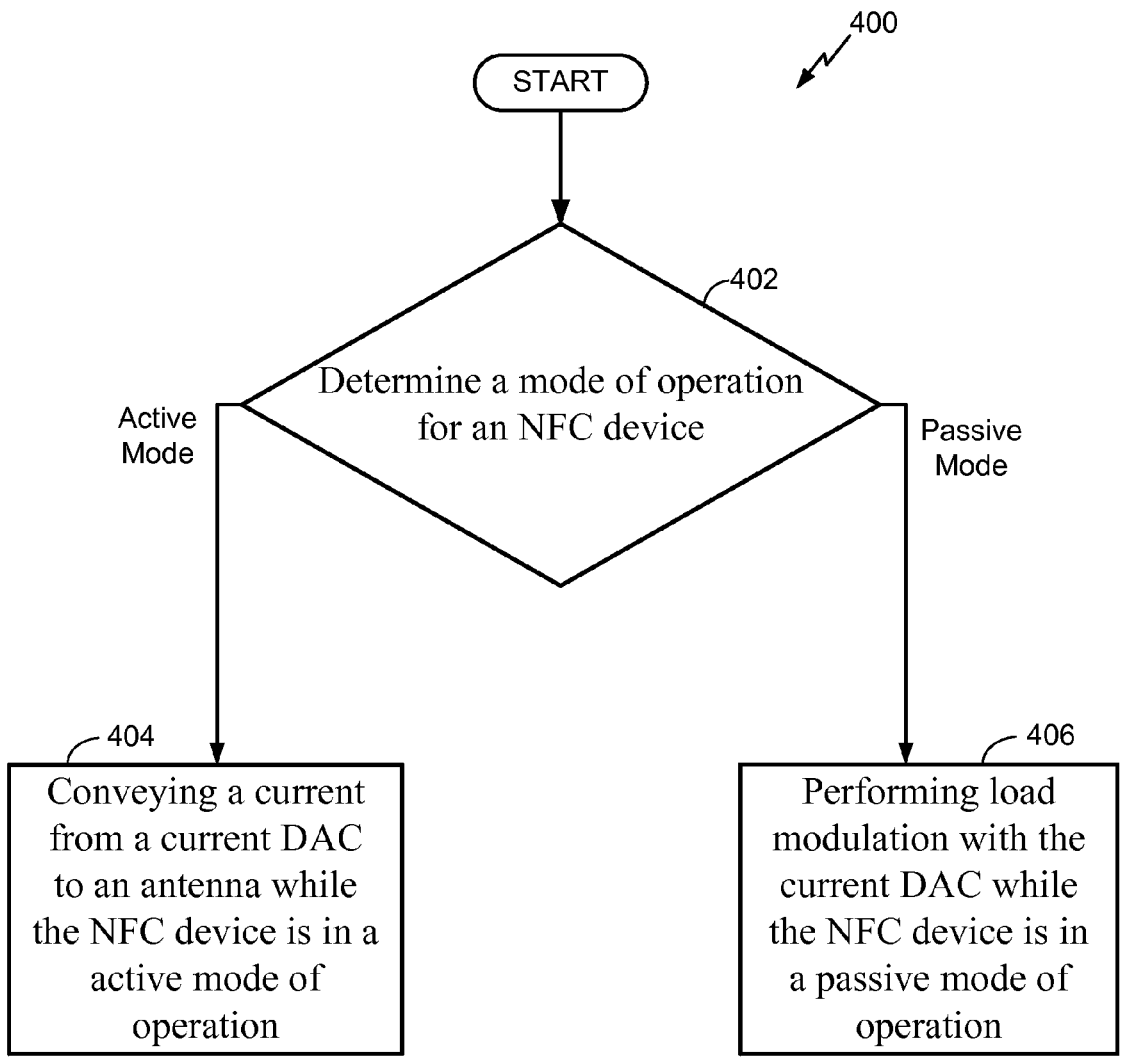
FIG. 9 is a flowchart illustrating a method, according to an exemplary embodiment of the present invention.

In accordance with an exemplary embodiment of the present invention, a low-voltage differential signaling (LVDS) driver stage may be reconfigured with a plurality of switches to perform load modulation. Further, an array of LVDS cells, wherein at least one cell includes one or more switches, may enable for adjustment of the strength of load modulation. Moreover, one or more LVDS cells may be configured to provide symmetry in load modulation. With reference to FIG. 8, a DAC cell 350 is illustrated. DAC cell 350 comprises a LVDS driver including a plurality of transistors M17, M19, M20, M21, M23, and M24 and current sources 252 and 254. Additionally, DAC cell 350 includes cascode devices M18 and M22, which, as noted above, may provide added protection for DAC cell 350. DAC cell 350 further includes a plurality of switches S1-S8, in accordance with an exemplary embodiment of the present invention. As will be appreciated by a person having ordinary skill in the art, DAC cell 280 may be configured to receive input signals $V_{cas1}$, $V_{DD}$, $D_p$ and $D_n$ from, for example, control module 207, output a current $I_{out\_4}$.

It is noted that in the configuration illustrated in FIG. 8 (i.e., switches S2, S4, S5, and S7 are closed and switches S1, S3, S6, and S8 are open), DAC cell 350 is in an active mode and, therefore, is adapted to drive a current into an associated antenna). In other contemplated configurations, DAC cell may provide load modulation. During load modulation, current sources 252 and 254 are each off. Further, when S2, S4, S5, and S7 are closed, the circuit effectively resembles a diode (formed by M23) and small resistances (formed by M19, M20, and M24). Effectively, if the voltage swing across the output nodes (Iout_4) is larger than one threshold (Vth), the path turns on and modulates the load. It is noted that the reason for placing a diode-connected devices, M23, is to introduce some hysteresis in the operation of the circuit. Similarly, cell 350 may be configured such that switches S1, S3, S5, and S7 are on and the rest of the switches are off. Accordingly, cell 350 may still operate in the load modulation mode but the polarity of the hysteresis is alternated. Further, if switches S2, S3, S6, and S8 are on and the rest of switches are off while 252 and 254 are conducting current, then the driver cell operates in the active mode and drives current into the antenna.

Therefore, in accordance with various exemplary embodiments of the present invention, a DAC cell (e.g., DAC cell 350) may be configurable, via one or more switches, to drive (i.e., convey) a current in an active mode and support load modulation in a passive mode. Accordingly, current DAC 200 including DAC cell 350 may be programmable for operation in both active and passive modes. It is noted that a cell configuration may be consistent throughout a current DAC.

A contemplated operation of DAC cell 350 will now be described. During an active mode (i.e., a mode in which current DAC 200 is conveying a current to antenna 204), switches S2, S4, S5, and S7 may be closed and switches S1, S3, S6, and S8 may be opened. Therefore, as will be understood by a person having ordinary skill in the art, current $I_{out\_4}$ may be conveyed to an associated antenna, along with the current from other cells within the DAC. Furthermore, during a passive mode, one or more of switches S1-S8 may be reconfigured to provide load modulation, as will be appreciated by a person having ordinary skill in the art.

It is noted that the exemplary embodiments, as described herein, may require a smaller area in comparison to prior art devices. For example only, an 8-bit DAC (e.g., DAC 202), which is configured to handle 50-80 mA of current may occupy 0.05 mm2 of area in a deep submicron CMOS such as 90 nm process.

FIG. 10 is a flowchart illustrating a method 400, in accordance with one or more exemplary embodiments. Method 400 may include determining a mode of operation of an NFC device (depicted by numeral 402). As noted above, a control module, such as control module 207 may be configured to determine whether a NFC should be in an active mode or a passive mode. Method 400 may also include conveying a current from a current DAC to an antenna while the NFC device is in an active mode of operation (depicted by numeral 404). Further, method 400 may include performing load modulation with the current DAC while the NFC device is in a passive mode of operation (depicted by numeral 406).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   an antenna; and
   a current digital-to-analog converter (DAC) configured to convey a current to the antenna in a first near-field communication (NFC) mode and enable for load modulation in a second NFC mode.

2. The device of claim 1, the current DAC comprising a plurality of drivers, each driver of the plurality configured to convey a current to the antenna.

3. The device of claim 1, further comprising a digital filter coupled to the current DAC.

4. The device of claim 1, further comprising a digital up-converter coupled to the current DAC.

5. The device of claim 2, each driver including one or more cells configured for conveying a current to the antenna.

6. The device of claim 5, each cell of the one or more cells including a low-voltage differential signaling (LVDS) circuit.

7. The device of claim 5, each cell of the one or more cells configured to receive on or more control signals and output a current.

8. The device of claim 6, the LVDS circuit comprising a plurality of switches to adjust a load modulation strength.

9. The device of claim 6, the LVDS circuit comprising at least one cascode device.

10. The device of claim 2, each driver including one or more reconfigurable cells for one of conveying a current to the antenna and performing load modulation.

11. The device of claim 1, the current DAC configured to drive current to the antenna in an initiate mode and modulate a load in a load modulation mode.

12. A method, comprising:
    conveying a current from a current DAC to an antenna while in a first NFC mode; and
    performing load modulation with the current DAC while in a second NFC mode.

13. The method of claim 12, the conveying comprising conveying the current from the current DAC to the antenna in an active NFC mode.

14. The method of claim 12, the performing comprising performing load modulation with the current DAC in a passive NFC mode.

15. The method of claim 12, further comprising conveying a digital signal to the current DAC prior to conveying a current from the current DAC to the antenna.

16. The method of claim 15, further comprising filtering the digital signal with a digital filter prior to conveying the digital signal to the current DAC.

17. The method of claim 12, the modulating comprising modulating the load with one or more cells, each of the one or more cells comprising a low-voltage differential signaling (LVDS) circuit.

18. The method of claim 12, the modulating comprising receiving one or more control signals at the current DAC.

19. The method of claim 12, further comprising determining whether the current DAC should operate in a passive mode or an active mode.

20. The method of claim 12, the modulating comprising modulating the load by adjusting one or more switches within the one or more cells.

21. The method of claim 12, the conveying comprising conveying the current from one or more cells of the current DAC to the antenna, each of the one or more cells comprising a low-voltage differential signaling (LVDS) circuit.

22. A device, comprising:
   means for conveying a current from a current DAC to an antenna in a first NFC mode; and
   means for performing load modulation with the current DAC in a second NFC mode.

23. The device of claim 22, further comprising means for conveying a digital signal to the current DAC prior to conveying a current from the current DAC to the antenna.

24. The device of claim 22, further comprising means for modulating the load with one or more cells of one or more drivers of the current DAC.

25. The device of claim 22, further comprising means for adjusting one or more switches within one or more cells of one or more drivers of the current DAC.

* * * * *